United States Patent [19]

Moseley

[11] 3,709,197
[45] Jan. 9, 1973

[54] EXERCISING APPARATUS FOR HORSES

[76] Inventor: Corliss Champion Moseley, 1636 Summit Ridge Drive, Beverly Hills, Calif. 90210

[22] Filed: Jan. 7, 1971

[21] Appl. No.: 104,679

[52] U.S. Cl. ................................119/29, 272/69
[51] Int. Cl. .............................................A01k 13/00
[58] Field of Search ....................119/29, 82; 272/69

[56] References Cited

UNITED STATES PATENTS

| | | | |
|---|---|---|---|
| 3,485,213 | 12/1969 | Scanlon | 119/29 |
| 3,225,744 | 12/1965 | Proctor | 119/82 |
| 3,119,374 | 1/1964 | Ladner | 119/29 |
| 1,766,089 | 6/1930 | Wood | 272/69 |
| 2,155,684 | 4/1939 | Richards | 119/29 |
| 2,997,136 | 8/1961 | Gaines et al. | 119/29 X |
| 3,592,466 | 7/1971 | Parsons | 272/69 |

OTHER PUBLICATIONS

Washington Evening Star Newspaper "Bulls on Treadmill," Nov. 24, 1933 page B–1.

*Primary Examiner*—Aldrich F. Medbery
*Attorney*—Lyon & Lyon

[57] ABSTRACT

A mobile self-operating apparatus for exercising horses includes sidewalls defining a stall, a platform and guidewalls leading up to the stall, and an exercising surface on the floor of the stall. The stall is adapted to confine a horse within a limited area during an exercising period, the platform and guidewalls are collapsible to avoid interference with the travel of the apparatus, and the exercising surface is adapted to walk a horse within the stall at a predetermined uniform rate. The exercising surface is also adjustable to vary the walking rate of a horse and means are provided to prevent movement of the exercising surface when a horse is entering or leaving the stall and to initiate movement of the exercising surface at the beginning of an exercising period.

11 Claims, 4 Drawing Figures

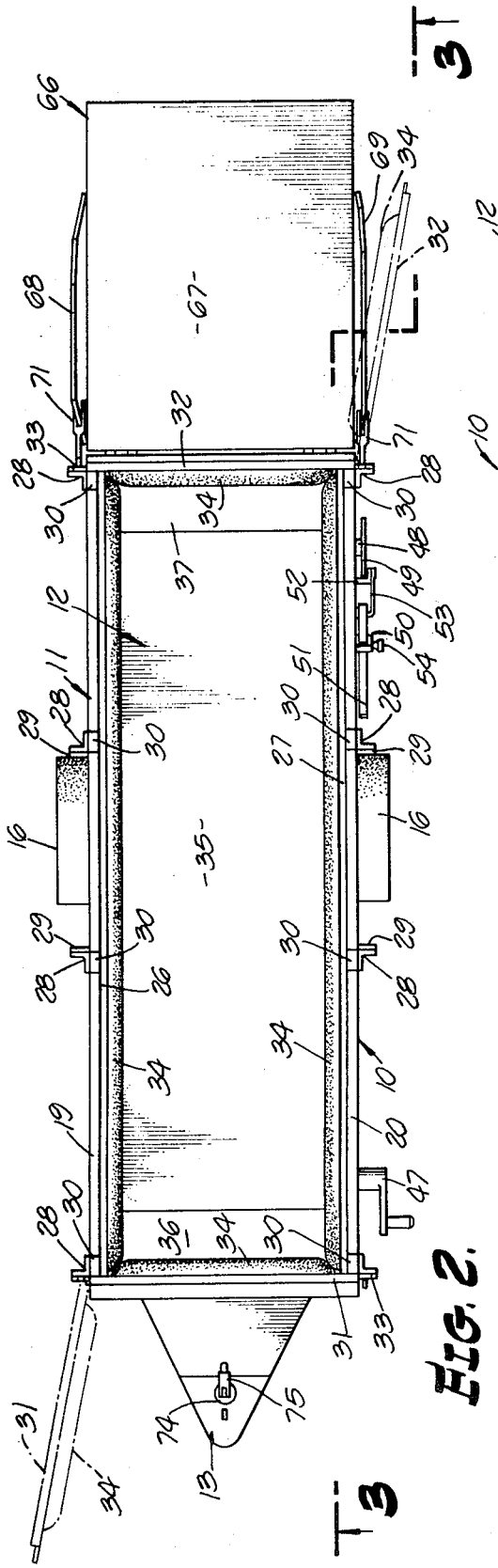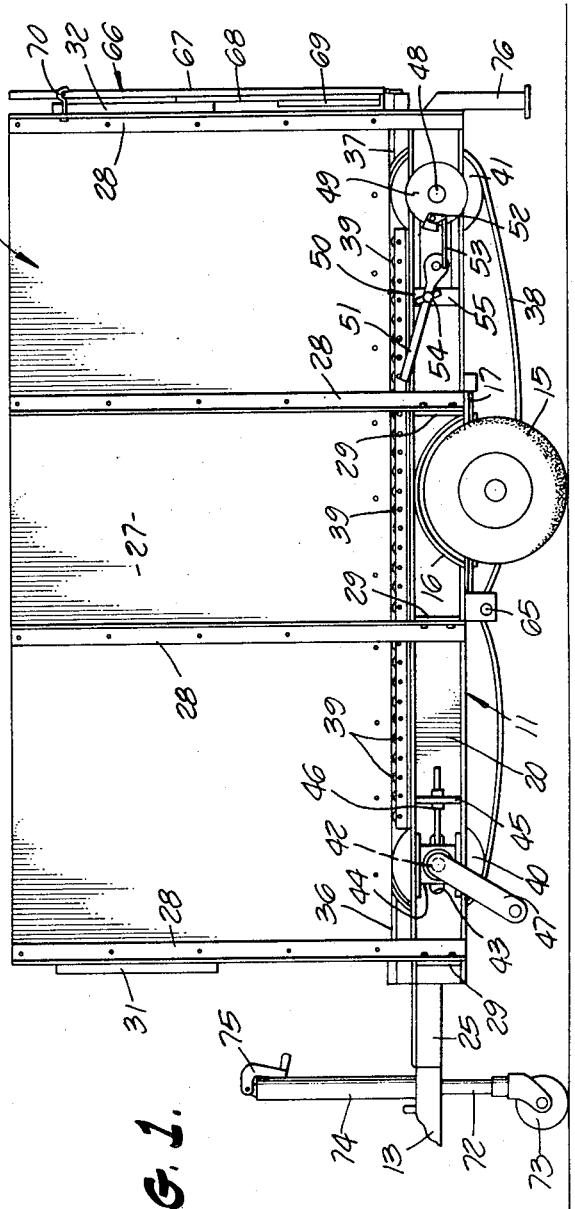

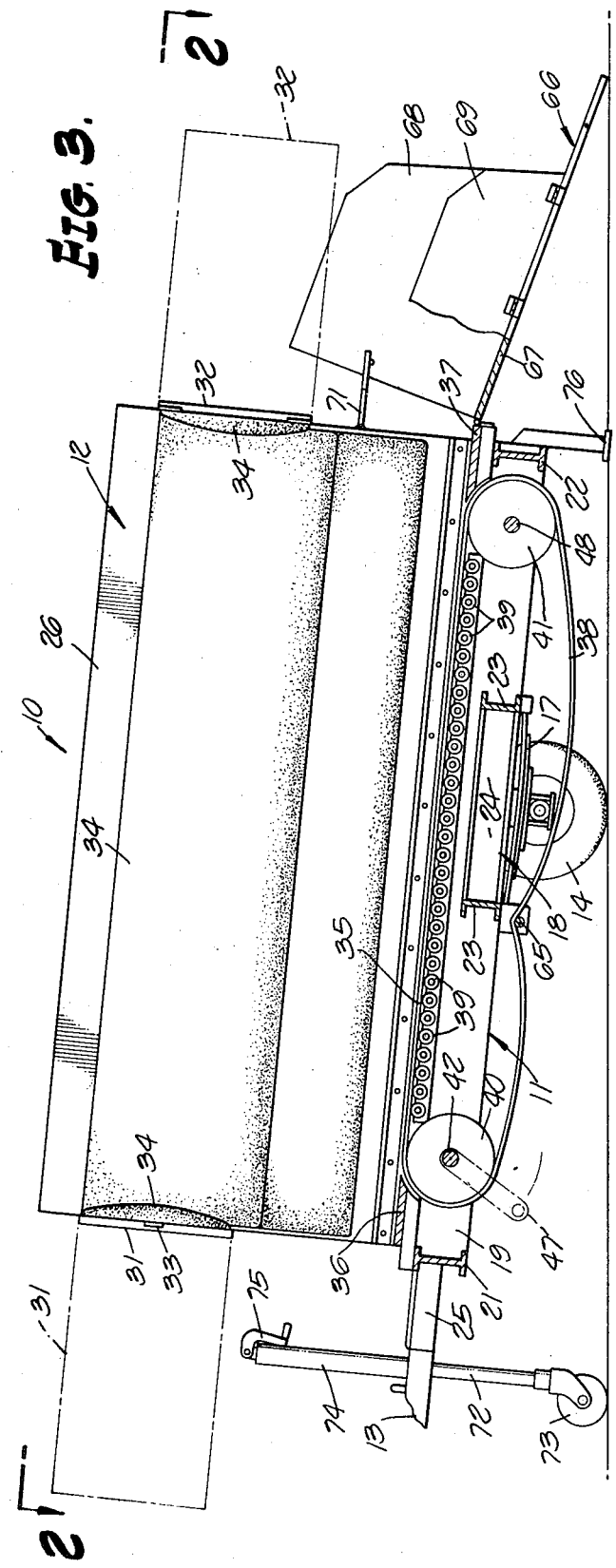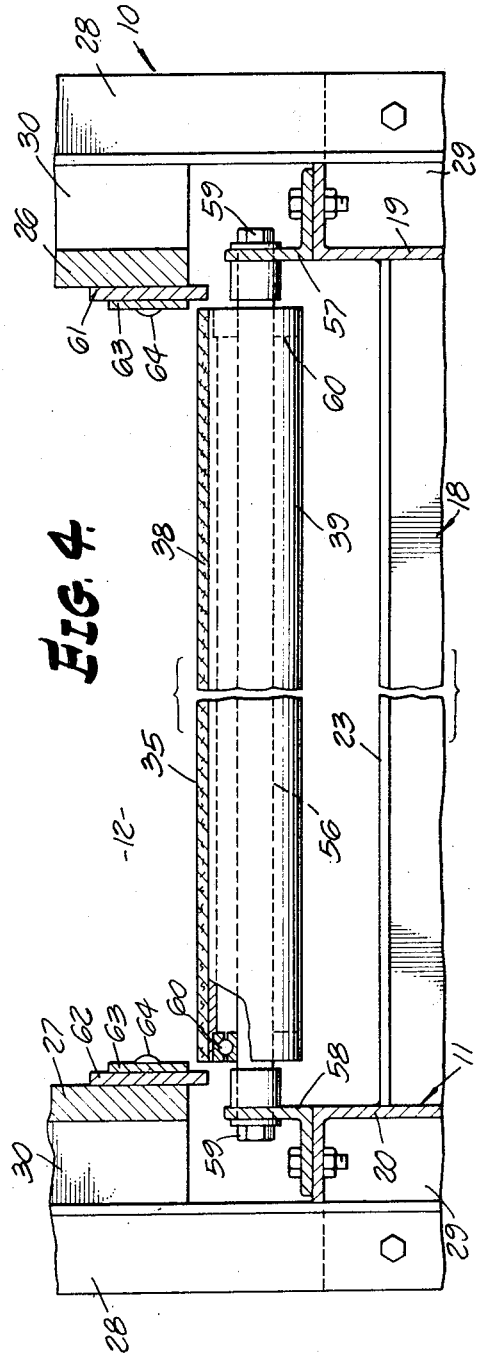

EXERCISING APPARATUS FOR HORSES

This invention relates to a horse exercising apparatus and more particularly relates to a self-operating exerciser which is adapted to walk a horse within a limited confined area at various predetermined uniform rates.

After a race or so-called "work-out" there is a cooling off period in which a race horse must be exercised in order to avoid possible injury or sickness to the horse. Traditionally this is accomplished by having an attendant walk the horse, preferably at a uniform pace, for a considerable period of time. Several other methods for performing this exercise without an attendant have been suggested in the past, each with varying degrees of success. Generally these suggested methods involve some form of apparatus which is either impractical to use because of its cost, possibly hazardous in one way or another to the horse, immobile and difficult to use, or incapable of producing the desired results.

Therefore, it is a primary object of this invention to provide a self-operating apparatus for exercising horses which will serve as a complete substitute for the attendant method of walking a horse. In accordance with this object, it is a further object of this invention to provide an exercising apparatus which includes various safeguards to avoid injuries to the horse.

Still another object of this invention is to provide a horse exerciser which will walk any size horse at various predetermined rates.

Such a self-operating apparatus briefly includes a mobile body unit having sidewalls which define a stall, a platform and guidewalls leading into the stall which are collapsible to avoid interference with the travel of the body unit, and a movable exercising surface on the floor of the stall which causes a horse to walk at a predetermined rate. The exercising surface is also adaptable to accommodate any size horse and adjustable to vary the walking rate of the horse. The apparatus also includes means to prevent movement of the exercising surface when the horse is leaving or entering the stall and means to initiate movement of the exercising surface at the start of an exercising period.

A still further object of the invention is to provide such an exercising apparatus which is relatively inexpensive to manufacture and is thereby a practical substitute for the traditional method of exercising a horse.

Other and further objects and advantages of this invention will be made readily apparent from the accompanying drawings and the following detailed description.

In the drawings:

FIG. 1 is a side view of the horse exercising apparatus as it appears when ready to be moved.

FIG. 2 is a top view taken substantially on lines 2—2 of FIG. 3, of the apparatus as it appears when ready for operation.

FIG. 3 is a side sectional view taken substantially on the lines 3—3 of FIG. 2 of the apparatus as it appears when ready for operation.

FIG. 4 is a segmental end view partially in section illustrating the exercising surface of the apparatus.

Referring now in detail to the drawings, the exercising apparatus comprises a mobile body unit, generally designated 10, which may be easily moved between operations. The body unit includes a frame assembly, generally designated 11, and a stall 12.

The frame assembly 11 is provided with a coupling or trailer hitch 13 at the forward end of the body unit 10 and a pair of wheels 14 and 15 on each side of the body unit 10 between the forward and rear ends but somewhat closer to the rear end of the body unit 10. Fenders 16 on each side of the body unit 10 are fixedly secured to the frame assembly 11 and extend over the wheels 14 and 15. The wheels 14 and 15 are supported by a leaf spring suspension system 17 which is secured to a frame sub-assembly, generally designated 18. The frame assembly 11 is comprised of steel elements or beams which are either welded or bolted together to form a rigid unit. The frame assembly 11 includes a pair of longitudinally extending side rails or channel beams 19 and 20, I-beams 21 and 22 which extend laterally between the side rails 19 and 20 at the front end and back end, respectively, and the frame sub-assembly 18 located between the front and back end. The frame sub-assembly 18 is a rectangular frame with two channel beams 23 extending between the side rails 19 and 20 and two channel beams 24 extending adjacent to the side rails 19 and 20 and between the beams 23. The coupling 13 is connected to the front I-beam 21 by a pair of forwardly converging rails 25.

The stall 12 is defined by parallel upright side walls 26 and 27 each of which is supported by a plurality of vertically extending supports or angle irons 28. The lower end of each angle iron 28 is bolted to a flange member 29 which is in turn connected to a side rail of the frame assembly and extends outwardly therefrom. The side walls 26 and 27 are connected to vertically extending spacers 30 positioned between the side walls and the supports 28 and secured thereto. Gates 31 and 32, hingedly mounted to front and back supports 28, respectively, on one side of the body unit, both include a latch mechanism 33 which is latched to a support 28 on the other side of the body unit 10. When latched, the gates 31 and 32 are adapted to partially enclose the front and back of the stall 12 and thereby confine a horse therein during operation of the apparatus. The inner surface of both side walls 26 and 27 and both gates 31 and 32 is provided with appropriate padding 34 to prevent injury to a horse confined within the stall 12.

The floor of the stall 12 includes an exercising surface 35, a front floorboard 36, and a rear floorboard 37. The floorboards 36 and 37 and the exercising surface 35 extend laterally across the floor between the side-walls 26 and 27 and the exercising surface 35 runs substantially the length of the stall 12 between the rear and forward edges of the front and back floorboards 36 and 37, respectively. The exercising surface 35 is formed by an upper portion of a continuous flexible movable belt 38 which is supported on a plurality of laterally extending rollers 39. The belt 38 is frictionally mounted on two drums 40 and 41 which extend laterally between the two side rails 19 and 20 and are rotatably mounted thereto adjacent the front and back floorboards 36 and 37, respectively.

The front drum 40 includes a shaft 42 which extends out from either side of the drum 40 and through identical elongated slots 43 in the side rails 19 and 20. The ends of the shaft 42 are each secured to brackets 44 which are slidably mounted on the outside of side rails 19 and 20. Each bracket 44 is secured to a fixably mounted flange 45 which extends outwardly from the side rail by a threaded rod and nut connection 46. The brackets 44 prevent lateral movement of the drum 40, but the threaded rod and nut connection 46 may be loosened to permit longitudinal adjustment of the drum 40 by sliding the shaft 42 within the slots 43. One end on the shaft 42 is also adapted to receive a detachable hand crank 47 which when turned by an operator will turn the drum 40 and initiate movement of the belt 38.

The rear drum 41 also includes a shaft 48 which extends out from the sides of the drum 41 through circular openings (not shown) in the side rails 19 and 20 and is rotatably mounted thereto. One end of the shaft 48 is secured to the rail 19 by appropriate means (not shown) to permit rotation of the shaft without permitting lateral movement of the drum 41 and the other end of the shaft 48 is connected to a disc 49 which is positioned adjacent the side edges of the rail 20. The disc 49 is adapted to cooperate with a drag-brake mechanism, generally designated 50, to impede or prevent the turning of the drum 41 and thus the movement of the belt 38. The drag-brake mechanism is secured to the side rail 20 and includes a pivotally mounted lever arm 51 which cooperates with a brake element 52 through linkage means 53 to cause the brake element 52 to frictionally engage the disc 49.

The degree in which the brake mechanism 50 impedes the turning of the drum 41 is adjustable and depends on the position of the lever arm 51. The lever arm 51 includes a lock in the form of a thumb screw 54 which is adapted to engage a bearing plate 55 to lock the arm 51 in any desired position. It should be noted that the free end of the lever arm 51 may also be provided with weights, not shown, which will cause the brake element 52 to frictionally engage the disc 49 without locking the arm in a predetermined position.

The rollers 39 are positioned adjacent the underside of the upper portion of the belt 38 and enough rollers are provided to support the upper portion of the belt 38 between the drums 41 and 42. As seen best in FIG. 4, each roller 39 is rotatably mounted on a shaft 56, the ends of which are secured to brackets 57 and 58 by threaded lock means 59. Bracket 57 is bolted to the top of the rail 19 and bracket 58 is bolted to the top of rail 20. The ends of each roller 39 are provided with bearing members 60 which permit rotation of the rollers about the shafts 56.

Protective sleeve members 61 and 62 are connected to the sidewalls 26 and 27, respectively, by mounting plates 63 and bolts 64 and extend downwardly into the space between the exercising surface 35 and the sidewalls 26 and 27 and thereby prevent a horse from catching a hoof in that space. A belt carrier 65 is mounted underneath and laterally across the frame assembly 11 and carries the lower portion of the belt 38 and thus prevents the belt 38 from dragging on the ground when there is a substantial amount of slack in the belt 38.

The rear end or entrance to the stall 12 is provided with a collapsible tail gate or plateform assembly, generally designated 66. The tail gate assembly 66 includes a flat platform 67, which extends laterally across the entrance, of the stall 12, and a pair of guidewalls 68 and 69 on each side of the platform leading up to the stall 12. The edge of the platform 67 adjacent the stall 12 is hingedly connected to the rear edge of the floorboard 37 and is thereby adapted to pivot about an axis extending laterally across the entrance of the stall and adjacent the rear edge of the platform. The bottom edge of the guidewalls 68 and 69 are hingedly connected to the side edges of the platform 67 and are thereby adapted to pivot about axes which are perpendicular to the pivotal axis of the platform 67. Thus, when the body unit 10 is being moved, the guidewall 68 is first pivoted about the side edge of the platform and laid flat across the upper surface of the platform. The guidewall 69 is then pivoted about the other side edge of the platform and laid across the guidewall 68 and it should be noted that the width of the guidewall 69 is significantly shorter than the width of the guidewall 68 to prevent interference with the gate 32. After the guidewalls 68 and 69 are folded over the platform 67, the platform is pivoted upwardly towards the closed gate 32 and secured to the back supports 28 by a latches 70. When leading a horse into or out of the stall 12 the platform is lowered to a position where the leading edge of the platform opposite the hinged edge is resting on the ground and the guidewalls 68 and 69 are raised to extend vertically up from the sides of the platform 67 and thereby prevent a horse walking on the platform from falling or moving laterally across the platform. The guidewalls 68 and 69 are maintained in the vertical upright position by yoke supports 71 which are pivotally connected to the rear angle irons 28 and are adapted to fit around each side of the guidewalls.

The body unit 10 is supported at its front or forward end by a shaft 72 having a wheel 73 at its lower end. The shaft 72 fits within a sleeve 74 connected to the body unit 10 and crank means 75 are provided to adjust the position of the sleeve 74 relative to the shaft 72. As seen in FIG. 3, such adjustment will cause the body unit 10 to pivot about the wheels 14 and 15 and thus the operating incline of the exercising surface 35 can be set at the desired degree by the crank means 75. When the exercising surface 35 is in the operating incline position, as shown in FIG. 3, the body unit 10 is further supported by a pair of downwardly extending legs 76 secured to the frame assembly 11 and adapted to rest on the ground during operation of the apparatus.

In operation, the body unit 10 is moved to a desired place of use and once there the front end of the unit 10 is raised by the crank means 75 until the legs 76 rest on the ground, this positions the exercising surface 35 at the desired incline. The platform assembly 66 is hen lowered according to the above described manner with the guidewalls 68 and 69 mounted in an upright position leading into the stall 12. The brake mechanism 50 is secured to prevent movement of the exercising surface 35 and the position of the front drum 40 is adjusted to provide the desired amount of tension in the belt 38. Then, with the rear gate 32 open and the front gate 31 closed, a horse is led up the platform 67 into the stall 12 and the gate 32 is closed behind the horse to confine the horse within the stall. The brake mechanism 50 is then at least partially released to allow movement to the exercising surface 35. When the horse is standing on the upwardly inclined exercising surface 35, the weight of the horse should cause the belt 38 to move around the drums 40 and 41 and across the rollers 39 in a direction towards the back of the trailer.

However, because of friction the belt may not automatically begin to move when the brake mechanism 50 is first removed and therefore to initiate movement of the belt 38 the hand crank 47 can be used. Once the belt 38 begins to move the horse will be compelled to walk and the walking of the horse and the weight of the horse will cause the belt to thereafter continue to move during the entire course of the exercising period.

This invention thus substitutes for an attendant normally used to exercise a horse. The invention provides an exercising apparatus which is provided with the appropriate safeguards to prevent injury to a horse. Moreover, it is a mobile unit, easy to operate and relatively free from breakdown. The apparatus is also provided with drag brake means operable to stop or impede movement of an exercising surface and along with other means causes a horse to be walked at a uniform predetermined rate.

Having fully described my invention, it is to be understood that I do not wish to be limited to the details herein set forth, but my invention is of the full scope of the appended claims.

I claim:

1. An exercising apparatus for horses, comprising: a mobile body said having upwardly extending sidewalls, said sidewalls defining a stall; an moveable exercising surface on the floor of said stall; means to incline said exercising surface with respect to the horizontal for causing the horse within said stall to walk; means operably connected to said exercising surface for initiating movement of said exercising surface when inclined and when a horse is standing thereon thereby stimulating the walking of the horse; and adjustable drag-brake means operably connected to said exercising surface for controlling the movement of said exercising surface whereby a horse is caused to walk at a predetermined uniform rate.

2. The apparatus of claim 1, wherein said means provided to initiate movement of said exercising surface when a horse is within said stall are manually operable.

3. The apparatus of claim 2, wherein said exercising surface is formed by a continuous flexible belt mounted on a pair of rotatable drums, said drag-brake means operably connected to one of said drums and said manually operated means operably connected to said other drum.

4. The apparatus of claim 1, wherein said exercising surface is supported by a plurality of rotatably mounted rollers, each said roller extending laterally across the floor of said stall.

5. The apparatus of claim 1, wherein a collapsible tailgate assembly is connected to said body unit, said tailgate assembly including a platform for leading a horse into and out of said stall and guidewalls on each side of said platform for preventing a horse from moving laterally across said platform.

6. An exercising apparatus for horses, comprising: a body unit including a rigid frame and sidewalls defining a stall; front and rear drums rotatably mounted to said frame; a continuous flexible belt frictionally mounted on said drums; a plurality of rollers supporting the upper portion of said belt between said drums, each of said rollers extending laterally across the floor of said stall and mounted at each end to said frame; said upper portion of said belt supported by said rollers forming a movable exercising surface on the floor of said stall; means to adjust the incline of said exercising surface; hand crank means operably connected to one of said drums for initiating movement of said belt when said exercising surface is inclined with respect to the horizontal and a horse is standing thereon thereby counteracting static friction forces acting on said belt, said rollers, and said drums and thereby stimulating the walking of the horse on said exercising surface; and adjustable drag-brake means operably connected to one of said drums for controlling the rate of movement of said exercising surface whereby a horse led into said stall onto the said exercising surface will be caused to walk at a predetermined uniform rate.

7. The apparatus of claim 6, wherein at least one of said drums may be adjusted longitudinally along said frame to vary the tension of said exercising surface.

8. The apparatus of claim 7, wherein said front drum includes a shaft extending outwardly from each side of said front drum, said frame including an elongated slot on each side of said body unit, said shaft being slidably mounted in said slots, and adjustable means slidably to said frame and connected to each end of said shaft for varying the longitudinal position of said front drum.

9. The apparatus of claim 6, wherein said drum operably connected to said drag-brake means includes a shaft extending outwardly from each side of said drum, a disc on at least one end of said shaft, said drag-brake means including a brake element adapted to frictionally engage said disc and means to vary and adjust the degree of friction between said brake element and said disc.

10. A horse exercising apparatus for walking a horse at a predetermined uniform rate, comprising: a mobile body unit including sidewalls and a rigid frame having a pair of longitudinally extending side rails, said sidewalls extending vertically upward from said side rails and defining a stall; a front and rear drum, each said drum having a shaft extending laterally across said side rails and rotatably mounted thereto; a continuous flexible belt frictionally mounted on said drums; a plurality of rollers mounted on said side rails and supporting an upper portion of said belt on the floor of said stall between said drums; adjustable means to incline the upper portion of said belt supported on said rollers with respect to the horizontal thereby inducing a horse walking thereon to continue the walking movement; said rear drum shaft having a disc connected to at least one end extending outwardly beyond said side rail; drag-brake means having a brake element being adapted to frictionally engage said disc and means to adjust the degree of friction between said disc and said brake element whereby the rate of the continued walking movement of the horse is adjustable to a predetermined rate independent of the degree of incline of the upper portion of said belt supported on said rollers;

11. The apparatus of claim 10 wherein hand crank means connected to said front drum shaft are provided, said hand crank means being adapted to initiate movement of said belt when a horse is standing on said upper portion of said belt supported on said rollers after being inclined with respect to the horizontal thereby counteracting static friction forces normally preventing movement of said belt and thereby stimulating the horse to begin walking.

* * * * *